United States Patent [19]

Neustein

[11] Patent Number: 5,224,150
[45] Date of Patent: Jun. 29, 1993

[54] PAGING SYSTEM

[76] Inventor: Simon Neustein, 1175 York Ave., #12B, New York, N.Y. 10021

[21] Appl. No.: 549,201

[22] Filed: Jul. 6, 1990

[51] Int. Cl.$^5$ .......................................... H04M 11/02
[52] U.S. Cl. ........................................ 379/57; 379/56; 340/311.1; 455/70
[58] Field of Search ...................... 379/57, 58, 61, 63, 379/211, 56, 111, 114, 121, 123, 124, 132–134, 137, 139; 340/825.44, 825.49, 825.54, 311.1, 313; 455/70, 218

[56] References Cited

U.S. PATENT DOCUMENTS

| 4,178,476 | 12/1979 | Frost ..................................... 379/57 |
| 4,198,545 | 4/1980 | Haist et al. ............................ 379/132 |
| 4,224,472 | 9/1980 | Zarount . |
| 4,644,351 | 2/1987 | Zabarsky et al. ...................... 379/57 |
| 4,706,272 | 11/1987 | Nishimura et al. .................... 379/57 |
| 4,713,808 | 12/1987 | Gaskill et al. . |
| 4,756,020 | 7/1988 | Fodale . |
| 4,845,491 | 7/1989 | Fascenda et al. .............. 340/825.44 |
| 4,852,154 | 7/1989 | Lewis et al. . |
| 4,868,860 | 9/1989 | Andros et al. ........................ 379/57 |
| 4,897,835 | 1/1990 | Gaskill et al. . |
| 4,907,256 | 3/1990 | Higuchi et al. ....................... 379/137 |
| 4,933,931 | 6/1990 | Kokubo . |
| 4,940,963 | 7/1990 | Gutman ................................ 379/57 |
| 4,975,942 | 12/1990 | Zebryk . |
| 5,003,584 | 3/1991 | Benyacar et al. .................... 379/119 |
| 5,003,585 | 3/1991 | Richer . |
| 5,007,084 | 4/1991 | Materna et al. . |

FOREIGN PATENT DOCUMENTS 0284561 12/1987 Japan ..................................... 379/132

OTHER PUBLICATIONS

Article: Telephony, "With Swedish Paging System, You're Only a Phone Call Away", by Osten Makitalo, vol. 198, No. 21, May 1980.
Article: Japan Telecommunications Review, vol. 19, No. 3, "New Radio Paging System", by Komura et al., Jul. 1977, pp. 217–225.
"Calling Party Pays", by Chris Witze, pp. 50–55, Dec. 1988, Cellular Business.

Primary Examiner—Curtis Kuntz
Assistant Examiner—Dwayne D. Bost
Attorney, Agent, or Firm—Staas & Halsey

[57] ABSTRACT

A paging system, which includes of a number of central stations, each of which contains a number of pager apparatus associated with it. Each pager apparatus responds to one or more identifying numbers so that a caller may send a paging message to one or a number of pager apparatus. The caller has a pager which is also paged to allow the caller to verify that the transmission of the page has occurred. Auditorium cutoff allows a local transmitter to disable the audio response of pagers within or entering into a local area.

2 Claims, 13 Drawing Sheets

INPUT DATA SEQUENCE

| x | access code | called's number | # | message | # | credit card number | # | password | # | options | # | voice | # |

FIG.3

PAGING SYSTEM

FIELD OF THE INVENTION

This invention relates to a paging system comprising various central stations, each of which controls a number of pager apparatus. Each central station contains a profile or a listing of transmission services for each of the pager apparatus associated with that station. The profile includes, among other information, a listing of plural identification numbers to which a pager apparatus will respond, screening capabilities to limit who can reach the called party, echo capabilities to advise the caller of the completion of a paging call, and other items.

BACKGROUND OF THE INVENTION

Paging systems are well known in the art. The paging systems operate wherein a calling party sends a message to the control station or clearing house which then transmits the page to the pager apparatus. The pager apparatus receives a signal resulting from the call and includes an audio and/or visual indicator associated with it to inform the called party that he has been paged. In some paging systems, a numeric field such as the telephone number of the calling party is displayed on the pager apparatus. In others, limited messages can also be transferred from the calling party to the called party through the central station.

Generally, the individual placing the call is referred to as the caller, and the individual holding the pager apparatus as the called party. Paging apparatus differ from telephone equipment in that pagers can only receive remotely transmitted signals and alert the called party but they do not have the capability of transmitting responses. Thus, they cannot support real time, two-way communication. Hereinafter, reference to a pager, pager apparatus or receiver, refers to a device of this type.

Various paging systems have been well known in the art. By way of example, U.S. Pat. No. 4,172,969 issued to A. B. Levine describes a paging system wherein a transmitting station automatically receives and transmits limited content coded signals from a caller, and automatically sends out messages to remotely located receivers. The pager receivers include a video display panel for displaying messages, and a memory for storing the messages for later retrieval and display.

U.S. Pat. No. 4,263,480, issued to A. B. Levine, further improves the aforementioned invention by expanding the size and scope of the transmitting station to comprise a central broadcast station capable of serving a large number of subscribers at greater distance from the station. It also provides completely automated operation in paging subscribers and transmitting messages thereto in response to a large number of callers. The pager receiver described by Levine requires that the station include an automatic answering device for instructing a telephone caller to dial an alpha-numeric address that selects one of the pager receivers and additionally instructs the caller to dial a further alpha-numeric limited content message to be transmitted to the selected receiver.

U.S. Pat. No. 4,618,860, to Toshihiro Mori, describes a radio paging method for use in transmitting radio call signals from a subscriber's substation through a base station to pager receivers in the form of a radio call signal, the message information is divided into a plurality of species to which key codes are assigned, respectively. The radio paging method described therein provides for rapid transmission of a wide variety of message information without the need for special input devices. Thus it is possible to increase greatly the calling rate in each radio channel. It also provides for drastic reduction of reception sensitivity at each pager receiver despite a substantial increase in transmission rate.

U.S. Pat. No. 4,706,272 to Nishimura et al provides for a paging communication system adapted to transmit an individual calling code from a base station to a plurality of receivers assigned to a particular group number. This invention circumvents the problem of conventional paging systems that are unable to inhibit information to a particular receiver within the same group. Furthermore, this invention inhibits information to those receivers that have as yet not renewed contracts for using the communication system by paying due rental fees.

While such paging systems have attempted to provide improved features, thus far, paging systems have not been able to provide a system that can be universal with pager use by each and every individual and yet individualized for selective features. Also, thus far, there has not been presented a system wherein the caller is billed for the call rather than the called party.

Additionally, typical paging systems include a central station which does little more than serve as an information transmission facility. Such systems may provide switching, forwarding or routing of the paging call. The call is initiated by the caller and the central station transmits the page to the called party. If the central station is in the nature of an answering service or a secretary, they can select which calls get through, but such selectivity is achieved by secretarial decision and restriction and not through automatic implementation of selection criteria established by the called party. Furthermore, there is no response given to the caller to assure him that the page has in fact been transmitted.

SUMMARY AND OBJECT OF THE INVENTION

Accordingly, it is an object of the present invention to provide an improved paging system which can be utilized by a large segment of the population and yet provides unique individualized selected services and features to each pager holder.

Another object of the present invention is to provide a paging system which gives the called party the ability to define the parameter of the calls that he will receive.

A further object of the present invention is to provide a paging system which includes a central station having a number of pager apparatus associated with it with a unique set of profile information stored for each of the subscribers associated therewith.

Yet another object of the present invention is to provide a paging system which can be used to call selectively an individual pager apparatus, a group of pager apparatus, or all pager apparatus associated with the central station.

Still another object of the present invention is to provide a paging system having a number of central stations each of which contains a plurality of pager apparatus associated with it, and having the ability of one central station to transfer calls to another central station.

Yet another object of the present invention is to provide a paging system wherein the caller is billed for the transmission of the page call to the called party.

A further object of the present invention is to provide a paging system wherein a pager holder can restrict the paging calls addressed to him through the use of a lockout provision, such as a password, or other security identifier, or through the use of a restrictive list of ID numbers that should be transmitted, or through the callers decision to accept a call after he receives the ID of the caller on his page apparatus.

Still another object of the present invention is to provide a paging system wherein a central station can store voice messages for a called party and send out an indication to the called party that it has a voice message stored and waiting for him.

Another object of the present invention is to provide a paging system which permits each of the pager apparatus associated therewith to be called through more than one identifying number.

A further object of the present invention is to provide a paging system which operates on a time synchronization arrangement to permit addressing groups of pager apparatus in each time frame thereby permitting reduced power utilization by the pager apparatus associated therewith.

Another object of the present invention is to provide a digital paging system which operates on a protocol achieving data synchronization, time synchronization, and message addressing to each of one or a plurality of pager apparatus associated therewith.

Yet a further object of the present invention is to provide a paging system permitting both local and global commands, as will be hereinafter defined, to the pager apparatus associated therewith.

A further object of the present invention is to provide a paging system which permits transmission of command signals to control remotely the pager apparatus associated therewith.

A further object of the present invention is to provide a paging system capable of processing and transmitting paging data to a single or, simultaneously, to a plurality of pager holders, such that each pager holder is identified by at least one distinct, and preferably, by a plurality of identifying means shared by other pager apparatus.

Still another object of the present invention is to provide a paging system permitting transmission of emergency signals to override any calls in progress to a particular pager apparatus.

A further object of the present invention is to provide a paging system permitting a pager apparatus holder to prioritize the messages he is to receive and to permit their display in a predetermined order.

Another object of the present invention is to provide a paging system which can limit the number of calls to be transmitted to a particular pager apparatus associated with the system.

The aforementioned and other objects, feature and features of the invention, are brought about in accordance with the present invention, wherein there is provided a paging system including at least one central station with a plurality of pager apparatus associated therewith. A caller utilizes a telephone or other electronic means to place a call to the central station, specifying the particular pager apparatus he wishes to page and send a particular message to that pager apparatus. The central station includes appropriate means for receiving the information from the caller. Processing means at the central station processes the information in accordance with a profile of information provided by the called party and the central station. Transmission means at the central station responds to the processed information, signals the specified pager and transmits the information relative to the message being sent. Calculating means associated with the system bills for the transmission of the call. It should be understood that reference to a "call" includes not only telephone calls but also calls through other electronic means.

Accordingly, pager apparatus can be provided to a large segment of the population, if not all of the population. Preferably these are low cost, low power consumption pager apparatus which are carried by each individual. In current paging systems, it is the holder of the pager that is billed for use of the paging system. As a result, pagers have been limited to either emergency use or business use wherein the pager holder is interested in paying for the use of this service.

In the present system, the pager apparatus are of sufficiently low cost to be given away for free. The individual is not billed for having the pager apparatus. On the contrary, it is the individual who places the call who is billed for the use of the paging system.

Additionally, the central station contains a profile of information for each of the pager apparatus associated therewith. The profile is a set of information stored within a computerized storage capability at the central station. It relates to the mode of operation and transmission services requested by the particular pager apparatus holder. Heretofore, in previous paging systems, the central station essentially only provided information transmission of the page from the caller to the called party. If the called party temporarily moved to another location, he would store a forwarding number in the central station thereby allowing the central station to forward his call. Thus, paging was simply a matter of transmitting a call from the caller to the called party.

In previous paging systems, any restriction on which a caller could get through was done almost in a quasi-manual way. By way of example, the pager holder would only give out his page number to a select number of people in order to restrict anyone else from paging him. Alternatively, he would only give his secretary or answering service his page number and they, in turn, would provide the selectivity. In all cases, however, the central station served only as a focal point for receiving paging calls and for determining the number for calling the pager apparatus. It did not provide for an intelligence processing, selectivity, or capabilities for the called party to specifically tailor the type of service to be received. The called party could not define the parameters for automatic control of the type and particulars of calls that were to reach him.

In the present system, the profile information stored at the central station is information which is set up for each individual pager apparatus and includes numerous types of information that a called party can set up at the central station. This information can restrict the type of calls, select the types of messages to get through, determine the various numbers by which the called party will respond, determine the type of signal that the called party wants to receive, and provide other characteristic information with regard to the service desired. When a call from a caller comes in, the central station first processes the call based on the profile information selected by that called party. Based upon the type of profile information, it then determines whether the call will go through, the type of alerting signal it will emit, the requirement that the caller insert an ID number, the selection of particular caller ID numbers for priority paging, and other information with respect to the page. It should be appreciated that this ability of a paging system to provide processing of paging information and not merely transmission of paging data is unique. Furthermore, the use of an information profile for processing the page wherein the called party can initially define the parameters of the calls it receives, is also unique with the present system. Thus, processing is used in the sense of acting upon the incoming call to make such changes and modifications as are needed to comply with the profile of information set up by the called party.

By way of example, information in the profile can include various numbers to which the pager apparatus will respond. While in typical prior art systems, each pager is uniquely identified by a single number, in the present paging system, each pager apparatus can be called by means of a plurality of identification numbers. The pager can respond to its own assigned number as well as to a number which is part of a corporate or family group, etc. Thus, if one desires to place a call to all members of a corporate group, one can do so through a single call which will be transmitted through the identification number associated with that company group. Likewise, one can call all members of a family group with a single call, and so forth.

Moreover, the identification number can include not only the number itself, but also prefixes, suffixes, or additional extension numbers. Thus, a particular identification number can be assigned to a family and an additional suffix to each of its members. Thus, each pager apparatus can be particularly selected not only by the family telephone number, but by the individual member of the family through the entry of an additional prefix or suffix. It should be noted that while these identification numbers can be accommodated in the profile information, they could also be stored in the memory of the pager apparatus.

There will also exist a group profile for all the pager apparatus belonging to a group such as a corporate group, a family group, etc. Each individual profile is linked to all the group profiles with which the pager is associated. Information can therefore be shared between related profiles. When a caller calls a number which relates to a group of pagers, such as a corporate or a family group, or the like, the system checks the group profile and determines which pagers are associated with that group. Typically, each pager responds to more than one identification code. Thus, in addition to its own unique identification code it will also respond to the code for the group or groups to which it belongs. Normally, all the identification codes to which a pager responds are built in the memory of the individual pager units. These ID codes could be altered remotely. When a pager is added to another group, it includes the additional group identification code or the existent pager of the new group could be remotely reprogrammed to include the new code. Alternatively, it is possible to list all the individual pager codes which belong to the group. When a group page is received, it will transmit the individual pager codes to all members of the group rather than a single group code. Furthermore, the system can have both a group code for original participants and individual codes for those pagers added on which have not yet been updated with new apparatus having the ability to receive the group code.

Other types of services can also be associated with each profile. The pager apparatus holder can prioritize the types of messages that he wants to receive in a certain order, and these will, likewise, be displayed within that particular priority order.

Additionally, certain messages can be restricted so that the pager holder will selectively receive only certain messages. The restrictions can be included at three different levels. The first is where the called party requires that each caller dial a preassigned password to allow his page to go through. In this way, the called party can give the password only to individuals of his choice, thereby, completely controlling access to his pager. The passwords are also stored in the profile information to be matched up and to ensure that the correct password is inserted for that called party. A second level of security can be included. In this case, the called party gives a list of personal identification numbers to the central station for inclusion in his profile of information. As each caller dials into the central station and thereafter dials the number of the called party, he is instructed to insert his own ID number. The ID number may be the telephone number of the caller or another ID number associated with the telephone calling card that the caller may have. Once the ID number is inserted, the profile information compares the ID number with the list of ID numbers stored in the profile information for that called party. If there is a match, the page will go through. Otherwise, the caller is notified that he is not cleared for making that paging call.

A third level of screening allows every call to go through. However, along with the call, the caller must again insert his identification number. When the page is transmitted to the called party, the ID number of the caller is also transmitted. Alternatively, the central station can match the ID number of the caller with his actual name and, instead of transmitting to the called pager the ID number of the caller, it can instead transmit the name of the caller. As a result, all page calls get through to the called party. However, the called party can now determine who is calling him and can selectively decide to whom he wants to respond.

As part of the profile information for a particular called party other information to be elicited from the caller. For example, the level of urgency can be elicited, etc. The profile information can also include handling of emergency calls, checking caller ID numbers, times when paging calls can be transmitted, and other parameters desired by the called party.

Particular pager apparatus can also be limited within their profile so as to receive only a restricted number of calls. This can be used to avoid abuse by children, preventing them from making multiple paging calls to friends. The profile can also identify the type of sound and visual signals to be emitted for certain types of calls. Thus, the pager apparatus holder can request to be signalled with one type of signal for certain calls and with another signal for other calls. This is especially useful for emergency calls which can emit a specified audio signal at the pager apparatus. Furthermore, emergency signals will generally override any type of ongoing calling signal previously received.

The central station also contains the ability for storing voice messages. While these cannot be transmitted to the pager, an indication can be transmitted to the pager that a voice message is being stored for it at the central station. The pager apparatus holder can then call in to the central station and receive the voice message waiting for him.

Through the use of a plurality of central stations, each of the central stations has associated therewith a number of pager apparatus. A particular caller calls the nearest central station and thereafter dials the telephone number of the pager apparatus he desires to page. He then enters his message, thereafter entering his own billing number or telephone number to be billed for the transmission of the call. There could also be other options available or built in simple defaults. For example, billing the phone number called from if no ID or billing number is entered.

The entire paging system can be set up with an "900" toll free number. Any caller simply calls into the "900" number and he is automatically connected to the closest central station which will receive his page. The central station into which the caller is connected then checks the called number and determines the appropriate central station of the called party and transfers the call to that central station.

The central station to with which the particular called pager apparatus is associated with will handle the message for the called pager apparatus. If the called party happens to be associated with the same central station to which the caller placed the call, the message will be processed only to that individual central station. However, if the called party is associated with a different central station, the central station of the caller will make contact the central station of the called party, query the called party's profile and transmit the call to the central station of the called party. The called party's central station will handle the transmission to the pager apparatus of the called party.

Through the use of the profile information, the holder of the pager apparatus can arrange to forward his calls. In that case, the caller will first call the called party. The central station of the called party will check the profile of the called party and determine from the profile where to transfer the call. It will then forward the call to the new central station at which the called party is temporarily located. In each case, it is the home central station with which the called party is associated that will handle the storage of information for that called party. This process is transparent to the caller.

The paging system operates in accordance with a preassigned protocol. By way of example, the protocol can include a frame of information commencing with a data synchronization, followed by a global code signal and thereafter a time synchronization signal. This is then followed by sequences of paging signals with each paging signal containing the address or identification number of the called pager apparatus followed by the particular message addressed to it. Instead of and/or along with the messages, particular control codes can also be utilized to control the operation of the particular pager apparatus either to enable or disable indicators, provide special indications or signals to the pager apparatus. Global codes are such that signals affect all of the pager apparatus within the central station. Local codes are those that affect less than all of the pager apparatus that belong to the particular central station.

Pagers can be grouped to be associated with different frames. A pager belonging to a particular group can only receive messages during the particular time interval that the frame is being transmitted. During the transmission of the other frames, the pagers of this group can all be powered down. Thus, for a particular short time interval, the frame which is sent out in accordance with the predescribed protocol will only address a limited number of pager apparatus, all operating during the same time interval. Thereafter, a second frame is sent out following the same protocol but this time addressing a second group of pager apparatus, again having their own common time. After all of the groups of pagers have been addressed, the sequence repeats with the message going back to the first group. During the time period the pager apparatus of a particular group are not operational to receive information, their particular pager apparatus can be switched to a low power mode, providing for low power consumption and long life of the pager battery, so as to reduce its cost, increase its longevity, and add convenience.

The system can also include an auditorium cutoff which provides a signal to all pager apparatus within a specified area to cut off operation of that pager apparatus so as to prevent any audio and/or visual indications from disturbing others within that area, such as in theaters, concert halls, etc.

BRIEF DESCRIPTION OF THE DRAWINGS

The novel features of the invention are set forth in the appended claims. The invention itself, together with any other objects and advantages thereof, may be better understood by reference to the following description, taken in conjunction with the accompanying drawings, in which:

FIG. 3 is an embodiment of the encoding of a preferred paging call sequence to be processed by the central station;

DETAILED DESCRIPTION OF THE INVENTION

Figure 1:
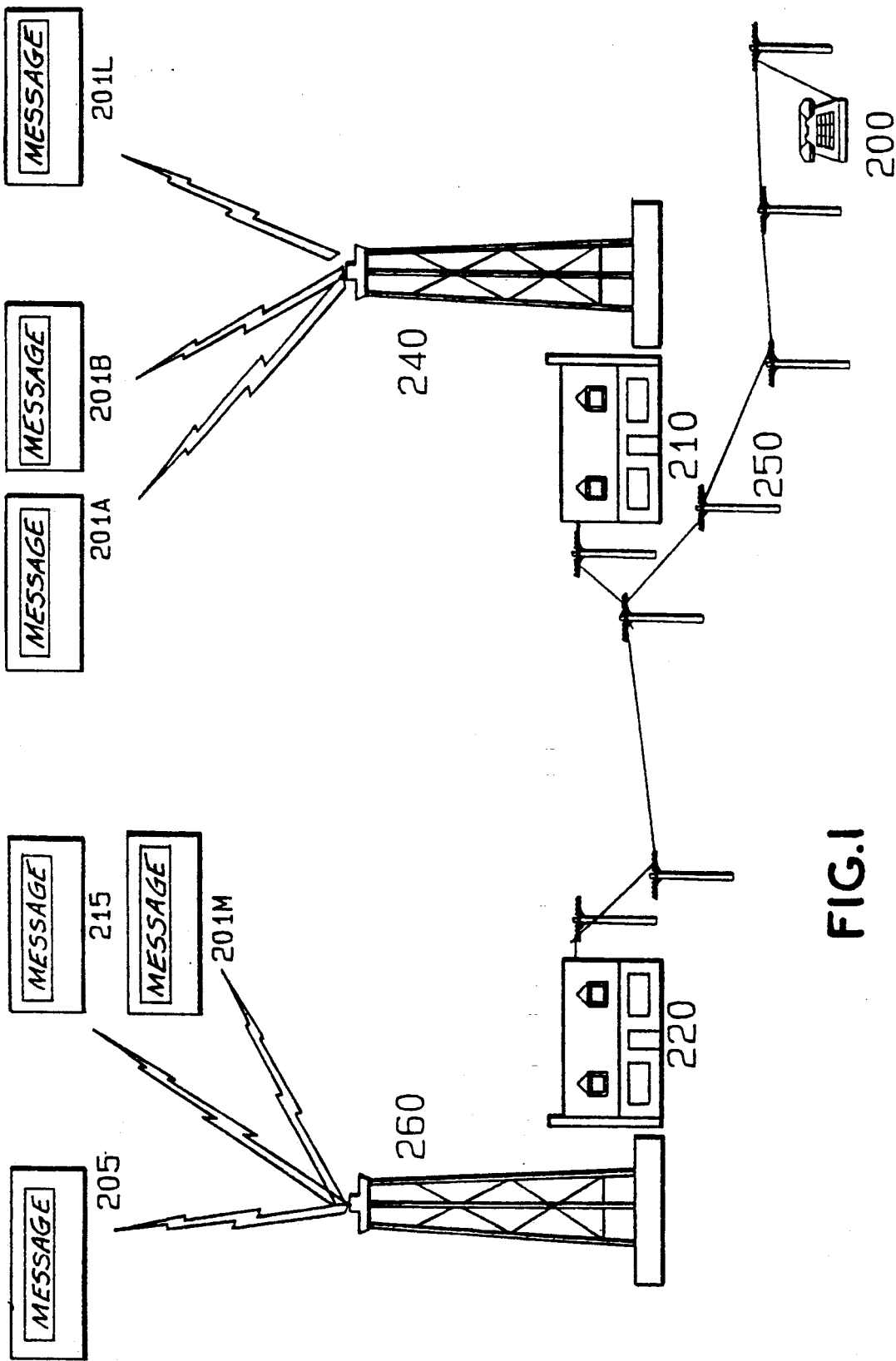
FIG. 1 shows a representation of the overall system comprised of central stations and plurality of pager apparatus at various geographical locations and means for simultaneously transmitting paging information to any selected subset of paging devices.

Referring now to FIG. 1, there are shown two central stations, 210, 220, each of which has associated therewith a single or plural radio transmitters, 240, 260, respectively, and other electronic equipment to be hereinafter described. Associated with the central station 210 are a plurality of individual pager apparatus identified as 201A, 201B, . . . 201L. Associated with the central station 220 are shown the pager apparatus 205, 115, and 201M Typically, an individual caller will use a telephone apparatus 200 in which he will call in to the nearest central station 210 via conventional telephone connections 250 or other electronic means. In the present system, it is anticipated that pager apparatus will be carried by everyone including the caller. Thus, the particular caller having his own pager apparatus will have his pager apparatus associated with a particular central system.

In fact, it is contemplated that the particular caller can utilize his own pager apparatus to aid him in making the telephone call by using his own pager apparatus as either a calling card, a telephone card, or at least to utilize it for transmitting his own telephone number or identification number or charge number to which the transmission of the paging call can be charged.

The caller will initially dial in the call to the nearest central station 21?. Thereafter, he will enter the telephone number of the pager apparatus to be called. If that pager apparatus is part of the central system dialed into, that pager apparatus will be addressed directly from this central station via the transmitter 240. If the called pager apparatus is part of another central station, such as 220, the page will be transferred to central station 220, and then it will be transmitted to the pager apparatus associated with that central station via transmitter 260.

Each central station contains profile information of all of the pager apparatus associated with that central station. Each pager apparatus responds to one or more identification numbers through which the pager apparatus can be addressed. Thus, the caller by dialing on the telephone 200, can enter an identification number which can be used to address either a single pager apparatus or multiple pager apparatus within the same central system or within multiple central systems. By way of example, he may want to address all employees of a particular company who may have a single identification number to which all their pager apparatus would respond, and he can do so by placing a single paging call.

As part of the profile of each pager apparatus, there is provided the means for transferring a call from one central station to another central station. By way of example, if the user of the pager 201M is travelling and is temporarily away from the geographical location of central station 210, he can indicate within his profile that calls be transferred to central station 220, where he is temporarily to be located. When a caller places a call to the pager 201M, the Central station 210 will check the profile of the pager 201M and determine that 201M can now be reached from the central station 220. It will, therefore, transfer the message to central station 220 which in turn will cause the signal to be transmitted from its transmitter 260 to the pager apparatus 201M.

Similarly, each group of pagers such as a company or family has its own unique identifying group profile as well. This group profile is linked to the profiles of the individual profiles. Therefore, the group profile includes the addresses of each of the individual pagers and the time intervals and frequencies needed to be transmitted to reach each member of the group. If one group member temporarily changes his paging address, modification in its profile is also transmitted to the group profile to which that individual belongs. If it happens that another member is already being paged at this new location during this time interval and at this frequency, the group profile is updated with the new address of the pager but there is no need for further change. If it is a new address for this group, the group profile is updated and each page is transmitted to the new address, as well. In transmitting the page to the individual pagers in the group, each individual pager profile is checked for the specific parameters of that pager.

Each pager address, therefore, includes the particular central station at which it can be reached, its time interval for addressing it, the frequency, and the particular code.

By an optimizing algorithm and by reprogramming the receiver's time intervals, the system can dynamically be optimized to reduce paging traffic congestion.

Although as will hereinafter be explained, the caller will be billed for the transmission of the call, it is also possible to bill the called party for special services, such as transferring of his calls from one location to another location. The called party can also instruct to reverse charges for calls to him.

Figure 2:
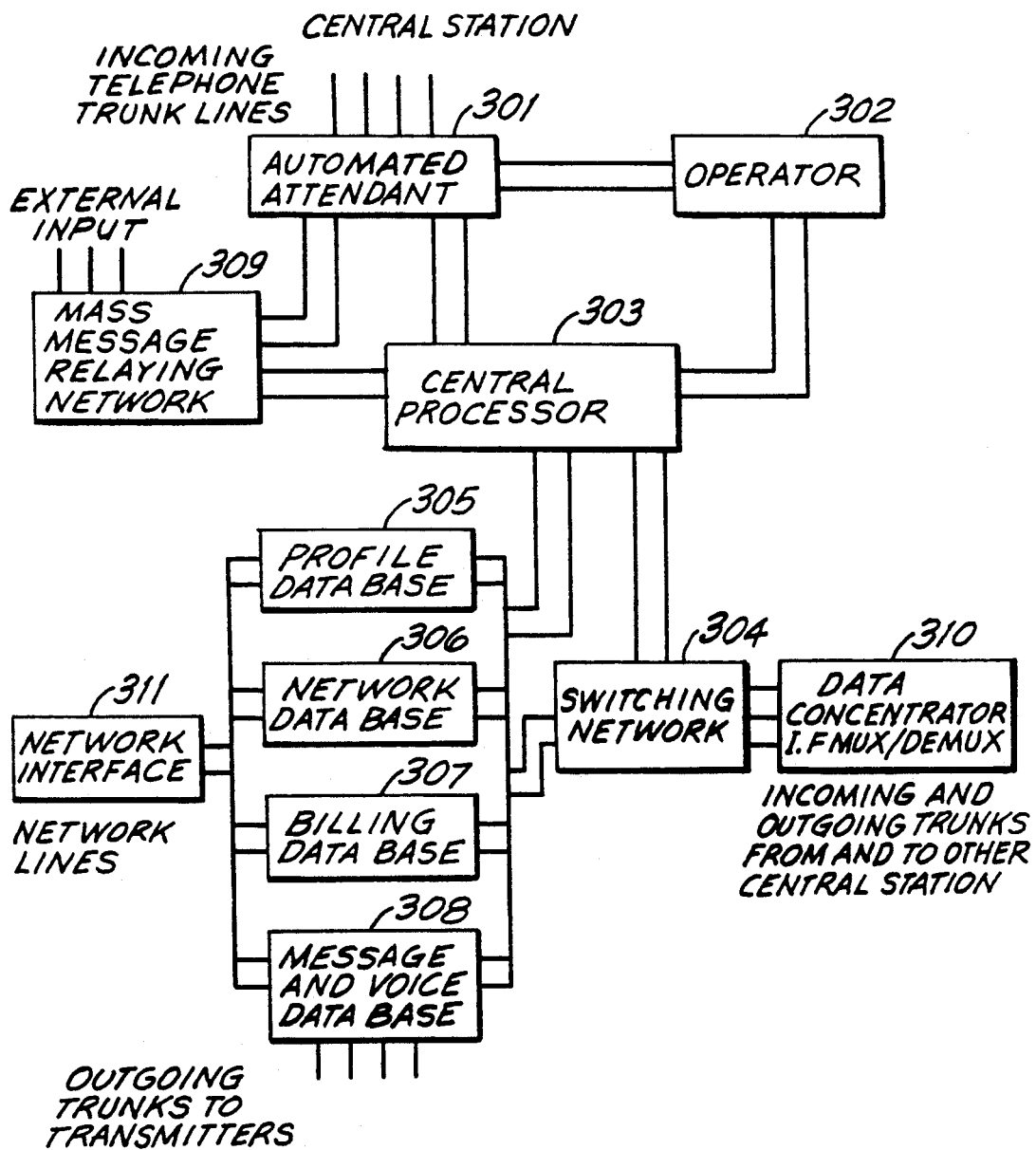
FIG. 2 is a block diagram of the typical central station.

Referring now to FIG. 2, there will be described a block diagram of the various means located at the central station for implementing the paging system to be described.

Central stations act as focal points for receiving, processing and transmitting messages from all paging apparatus connected to the system. A plurality of central stations, having their respective radio transmitters interconnected to each other via telephone or other transmitting means, constitute the backbone of the paging network.

In a preferred embodiment, the automated attendant 301 is selected as one of various possible entry points into the central station and is intended to assist a caller in making a page call. Its main function is to ensure that the caller properly enters all parameters required to complete a call successfully and to preprocess the incoming information. Thus, the automated attendant prompts the caller for the desired information, and provides, when necessary, appropriate default options. At times, a caller may require assistance that cannot be handled by the automated attendant. In such an event, the automated attendant passes the request to a human operator 302. The operator, in turn, may opt to transfer the control back to the automated teller once the problem is cleared up. By way of example, a caller may wish to send an alpha-numeric page but does not wish to use the telephone key pad. He may request the operator to handle his message, after which the control is transferred back to the automated attendant.

Another entry point into the paging system is provided by trunk lines 310 incoming into switching network 304 from other central stations. In this mode of operation, no automated attendant or operator is required. Its only requirement is that it transmit a message previously processed by some other remote central station. Other types of entry into the system include magnetic tape, and the like.

The central processor 303 is continuously supervising the various other units, and processes the flow of information. The central processor controls all paging requests from any of the above sources. Prior to directing the switching network 304 to transmit a page, the processor must first complete a sequence of tasks. For example, it checks the profile of the party being called by interacting with the profile data base 305. Based on the information contained therein, the processor may reverse the charges to the party being called, if so instructed by the profile of the party called. The processor then updates the billing data base 307 of the caller by adding the appropriate charges for the page call just completed. Otherwise, it stores this information and at a later, more convenient time it can forward this information to the appropriate locations.

Profile data base 305 contains detailed instructions to the processor for every customer associated with the central station. If the caller or the called party are associated with another central station, it needs to establish a connection with that central station via the network interface 311. Instructions may call for the transmission of only messages from a selected group of callers, while others may limit the transmission of only emergency calls from any source.

The profile data base will be distributed among the central stations, each one containing the profile of only those pager holders that are associated with that office. In some cases, there is a need for an independent network to access the profile information, in some cases, in real time. For example, the system may need to verify the credit card number of the caller. They may also need to verify that the called party is a subscriber to the network. If verification fails, the automated attendant will notify the caller.

The profile information permits the called party to specify three levels of screening of calls. In the first, he identifies in his profile information that a password must be entered by a caller before the central station may transmit the call to the called pager. In this way, the called party might distribute the password only to those selected individuals to whom he would give access to his pager.

In the second, the profile information requires that a caller must insert his own identification code after he has called this particular caller's pager number. Furthermore, there is a list of identification codes of specific callers that can get through. When the caller's identification code is inserted, it is checked in the list of accepted identification code numbers for this particular caller's pager and, if it is among those listed, the central station will then transmit the page to the called party.

The third level is where every call to the particular called party will get through. However, in this level, the caller must submit his own ID number. The central station then transmits to the caller's pager not only the page signal, but also the identification number of the caller. Alternately, it can check the identification code of the caller against a list of actual names and can actually transmit the full name of the caller to the caller's pager. In this way, the called party will receive the page and will also receive either the identification code or the actual name of the caller, and he can then decide whether to return the call in response to the page or not. There is, of course, the possibility of no screening at all.

The caller can also be instructed to insert other information as well. For example, he can advise the called party of the urgency of the call, the need to respond quickly, and other information.

Through the use of the identification code of the caller, as well as the ability to identify the actual name of the caller, an interconnection can be made between a telephone wired system and the pager wireless system.

Specifically, in a regular telephone networking system, when an individual places a call, he can be asked to insert his own identification code. The telephone network can then switch to the paging network and transfer the identification call of the caller to the paging network. The paging network will then look up the code of the caller and transmit to the pager apparatus of the called party the identification code or actual name of the caller. In this way, when one receives a telephone call on the wire line telephone network, he can look at his pager apparatus and see who is calling even before he answers the telephone call. It should be understood that using the time interval system of the present network there would be a time delay for response. However, if the system were operated in real time, there would be instant response.

Network related information resides in network data base 306. The processor requires this information to determine whether the caller or called party subscribe to the system, and to pinpoint the whereabouts of the party being called, i.e., whether under the jurisdiction of the central station that was prompted or at some other geographic location.

All alpha-numeric and voice messages are stored in the message and voice data base for future retrieval by the party being called. The frequency of storage and deletion of messages from the data base is determined either in the profile of the called or by the processor.

Once a message has reached its final destination central station, it resides in the message data base and awaits its turn to be transmitted to the radio transmitters. If the message needs to be forwarded, it is sent through the switching network to the appropriate outgoing trunks for transmission to the instructed other central stations.

The mass message relaying network 309 provides the necessary means for transmitting multiple messages to one or to plural pager holders. The input to this network may be either an external input, such as magnetic tape, or via the aforementioned automated attendant, or via the operator through the automated attendant. By way of example, the postal service forwards a request to the central station to transmit a tape containing mass messages. The automated attendant activates the mass storage relaying network to read in the postal service tape. The automated attendant prompts the processor to start processing the mass messages. The processor performs the routine checking and transfers the messages to the switching network for delivery.

Referring now to FIG. 3, which shows a preferred format for the call sequence that can advantageously be used to initiate a paging call. The parameters in the dialing sequence are as follows:

X: This parameter is either a 0 or a 1, consistent with current telephone nomenclature. At a pay telephone, a 1 indicates a direct payment by coins, whereas a 0 indicates deferred payment by charge card or by charging another telephone number. At a subscriber telephone, a 1 will add the charge to the telephone bill and a 0 will point to a charge call.

ACC: This code represents access to the paging system. It is similar to current long distance access codes, such as 001 or 900. If a call is initiated at a rotary phone, the paging call will require operator assistance.

CALLED: This represents the receiving party's identification code. It is normally comprised of an area code, a phone number, and an optional 4-digit suffix to differentiate members of a group or family. Programmed default options may automatically make up for any deficiencies. This sign is preferably used as a delimiter between fields. It is normally only used after variable length fields, such as the called party's telephone number whereby, the area code, telephone number, and suffix, can be selectively omitted. Hanging up the telephone is always interpreted as the final delimiter.

MESSAGE: This field normally consists of the message to be displayed on the caller's pager apparatus. Its length is limited by the size of the pager's display. Any combination of alpha-numeric characters can advantageously be used. For a simple page, the caller may hang up after this point, and the message will be transmitted.

CR: Represents the identification number of the caller, preferably, his credit or calling card number.

PW: This code represents the called access password intended to screen the pager holder from undesired or restricted paging calls. Every pager holder, preferably, specifies a password in his personal profile. A pager holder may opt for plural telephone numbers to beep his pager without requiring a password. This list of passwords and selected telephone numbers are also contained in the profile of the pager holder.

OPT: A variety of options can be entered in this field, some of which have already been described. An example of a useful option is the ability of requesting the display of a message or number or leaving a "voice message" without activating the audio transducer on the pager apparatus. Additionally, the caller can request a replay of his message for verification (as will hereinafter be explained).

VOICE: Voice messages may be left by a caller at the central station. The exercise of this feature automatically sets a "voice message" indicator at the pager apparatus. It is subsequently turned off by the transmitting station after the voice message has been retrieved by calling the central station.

It is evident that the plural fields previously defined can be expanded, reduced or modified without detracting from the intended spirit and scope of the present invention. It is also evident that any field may be omitted by placing delimiter signs (i.e., #) one after another.

At the time the caller places the paging call, the caller may be uncertain if the transmitter actually did transmit that paging call to the called party. As mentioned before, through the use of a special code dialed in the option field, the caller can ask for verification. Such verification can be achieved if the caller has his own pager apparatus available. As heretofore mentioned, it is contemplated that all members of the population will have a pager apparatus. Thus, the caller will have his own pager apparatus. By asking for verification, simultaneous with the transmission from the central station of the message to the address of the called party, it will also transmit the same message back to the caller. Since the caller must insert his own telephone number for billing purposes, the central station becomes aware of the identification number of the caller's pager apparatus and can transmit the message back to the caller around the same time that it transmits the message to the called party. Thus, the caller can look at his own pager apparatus and verify that the message was actually transmitted by the central station.

Figure 4A:
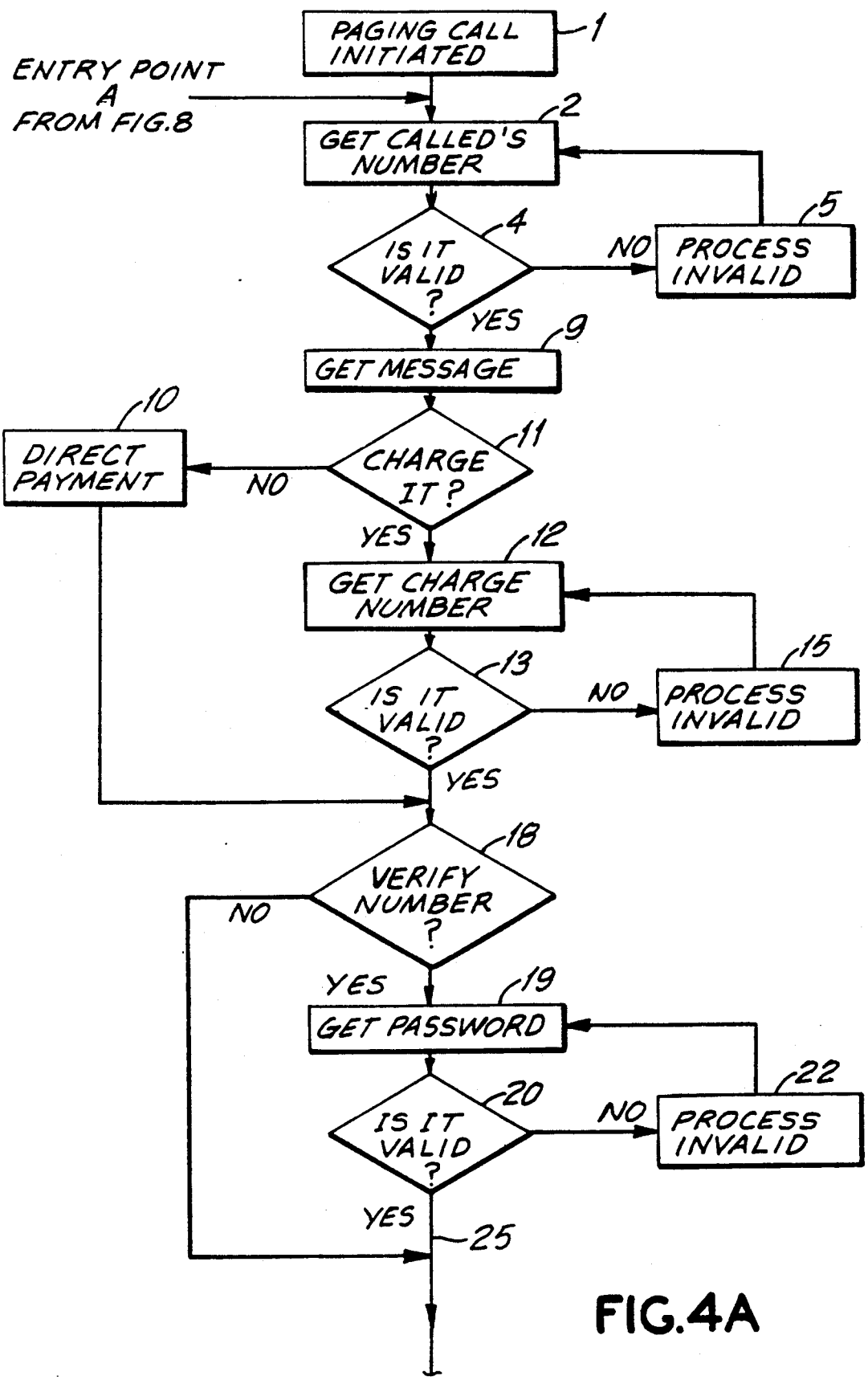
FIG. 4a and 4b, comprises a flow chart of the paging network input processor as seen at the transmitter's end.
Figure 4B:
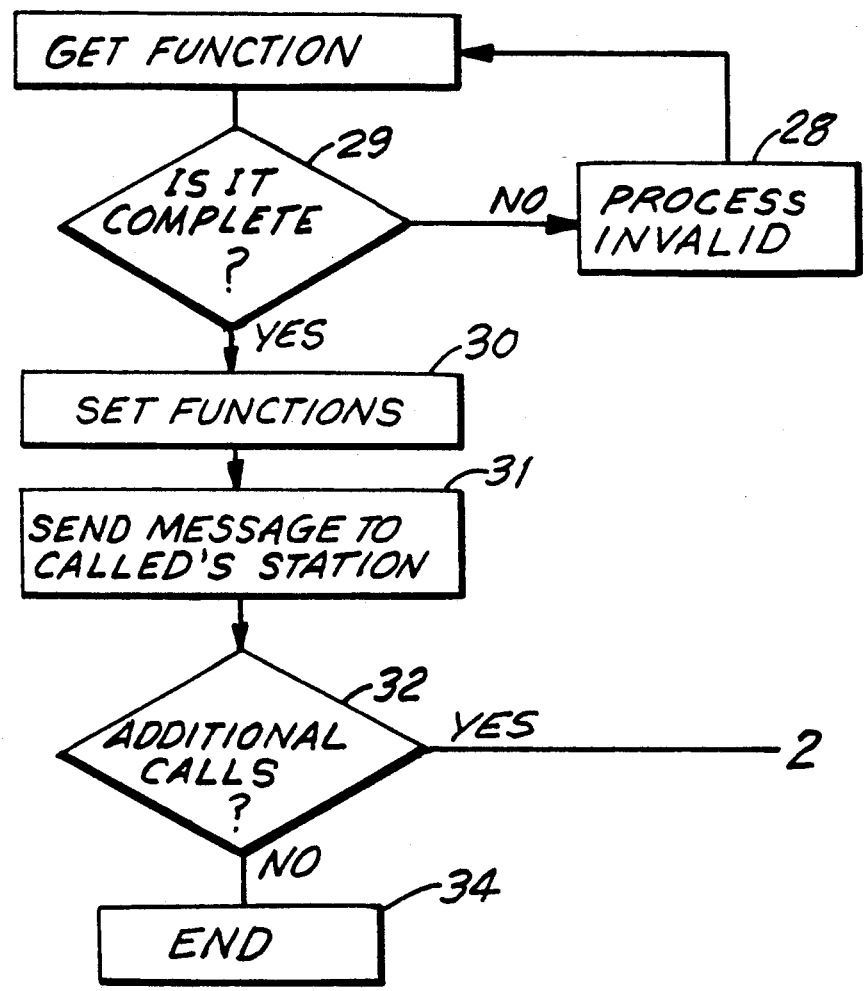

Referring now to FIG. 4, there is shown a flow diagram of the paging network input processor as seen by the caller. The caller initiates a paging call by dialing the central paging station via the established telephone network (block 1). This sets the paging central station in motion through a sequence of actions designed to locate the desired party or group of parties and transmit the intended message. It prompts the caller for a destination number (block 2) which, preferably, consists of an area code, a telephone number, and a 4-digit suffix. After the appropriate delimiter has been entered, the central station begins processing the called party's number to verify its validity, while it continues receiving the remainder of the message.

The coded number is normally followed by a message or a plurality of messages, each of which is, preferably, separated from the previous one by a delimiter. If the caller pauses for an extended period of time, a timeout feature, preferably built in the system, prompts the caller to continue entering data. If the inputted data lacks the appropriate delimiters or if he enters incomplete data, the system will branch to block 5 and alert the user of his erroneous entry. The system branches back to block 2, allowing the caller to correct his mistakes. After a limited number of faulty attempts, the system automatically aborts the call and disconnects the caller.

Referring now back to decision block 4. The caller may enter a shortened version of the code number while entering the number of the called party. Let the number of digits be considered. Any code with a length other than 4, 7, 10, 11 or 14 is invalid. In this case, a branch to block 5 takes effect and the number of invalid attempts is recorded. For each invalid entry, the system branches to block 2 prompting the caller for a new entry. After three faulty attempts, the central station aborts the call and disconnects the caller. There are several default options. For example, if the caller wishes to enter the telephone number of the called party and leaves out the area code. The caller's area code is automatically assigned to the incomplete entry. The processor concatenates the caller's area code to the number entered, ensuring the resulting combination is valid and that it corresponds to an active (e.g., on-line) pager. A combination of 10 digits corresponds to an area code and telephone number; a combination of 14, to an area code, telephone number, and suffix. This suffix, preferably, a combination of 4 digits, identifies each member of a group with the same area code and telephone number. For instance, suffix 0000 concerns only member 1; suffix 0001, member 2; suffix 0002, member 3. Suffix 1111, on the other hand, alerts all three members of the group with one call from the caller. The omission of the suffix can be defined to include all parties, the head-of-the-household alone, etc. Upon completion of entering a valid and complete code number, a message consisting of a sequence of alpha-numeric characters is entered (block 9). The caller can enter the message and at this point hang up and leave.

Referring now to block 11, the paging system has by now ascertained that the caller's number is correct and valid. The caller can pay for his paging call in a manner similar to present telephone calls, i.e., by billing his calling number or by charging it to a calling card, or by direct payment at the telephone apparatus. This could be controlled by the caller's entry of a "1" or a "0" at the beginning of his call. If the caller selects to charge his call, block 12 is invoked with a request to enter his charge number. The system verifies the presence of a delimiter, and checks whether the number entered is valid and active in the system. If the answer is NO, the system branches to block 15, and notes how many times an invalid number was entered, branching to block 12 with a new request for a valid number. After three invalid entries, the call is terminated (block 34). By entering the number of his calling card, the caller initiates a financial transaction which the system will handle off-line. If the answer to block 11 is NO, the caller is requested to deposit the appropriate amount at the telephone apparatus where he initiated the paging call (block 10).

The pager holder may wish to ascertain that only an authorized party can page him. The invention herein described makes provisions for such an alternative (block 18). The pager holder can specify passwords in his profile stored at the central station. Thus, if a caller enters the correct password (block 19), the message will be forwarded to the caller's pager. Otherwise, a recording will notify the caller that a valid password was not inputted and, therefore, the message cannot be forwarded (block 22). The system branches back to block 22, requesting a new entry. Failure to respond with a valid password is recorded and, at the third attempt, the caller is disconnected.

With completion of the aforementioned entries, the system is ready to initiate processing of the message (block 25). The caller can, at this point, specify various options in the next field. For example, a caller may wish to leave a voice message only and to exercise the option of bypassing the beep. In another case, the caller may want to transmit an alpha-numeric message accompanied by an emergency beep signal. The presence of a delimiter is audited as well as the completeness of the function that was invoked (block 29). A negative response forces the system back to block 25, whereby the caller is requested to correct the function of his choice.

Block 30 records the voice message of the caller if there is any. In block 30, all the functions selected are set in a digital data stream in accordance with the protocol described hereinafter, in FIGS. 6(a) and 6(b). All calls are forwarded to the appropriate radio transmission stations and are placed in a queue for future transmission. The processing of ID verification, billing, clearing indicators, etc., are performed at the local station. The information to be transmitted is also channelled to the appropriate transmission station in the various geographical locations where the paging devices of the parties called are located (block 31). The system interrogates the caller if he wishes to place an additional call (block 32). If he responds negatively, the system terminates the call (block 34). Otherwise, the system branches back to block 2 for the next round.

Figure 5:
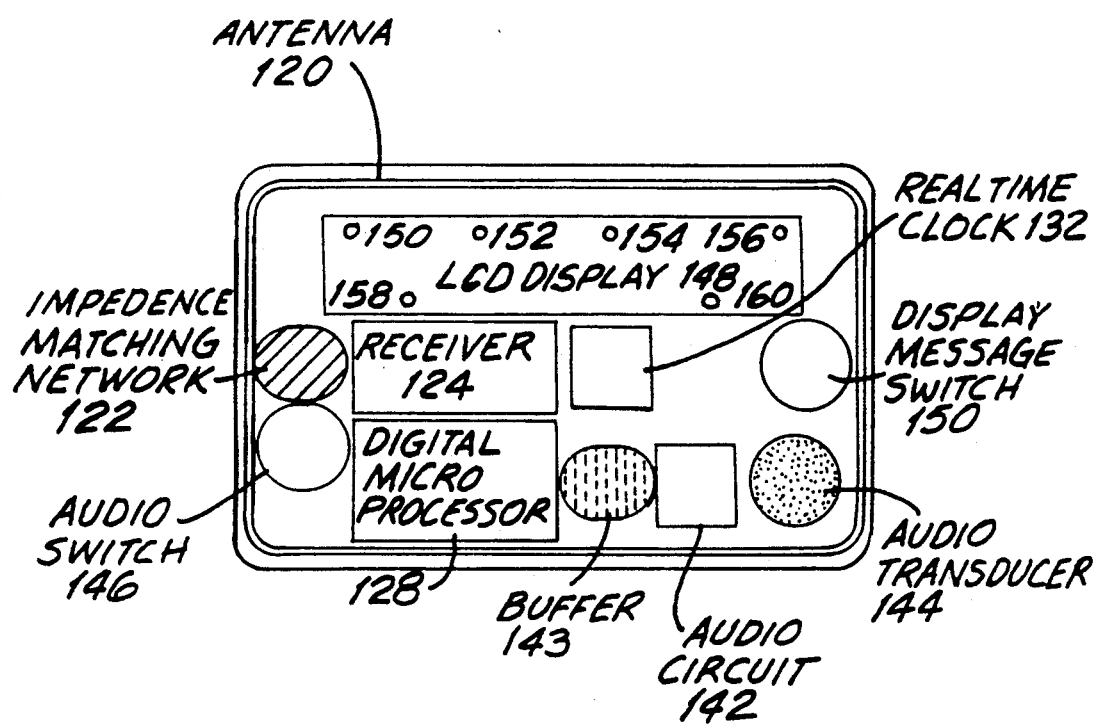
FIG. 5 is a schematic diagram of a typical pager apparatus as used by the paging system in accordance with the present invention.

Referring now to FIG. 5 shows the schematic diagram of a pager apparatus which could advantageously be used by the paging system in accordance to the present invention. Electromagnetic signals, transmitted by the central station, contain the paging messages to be received by the pager. These signals are captured by antenna 120, preferable a stripline antenna, and are forwarded to the receiver 124, preferably a SIGNETICS NE605, through an impedance matching network 122 which can be a transformer or an active matching network. The receiver receives, amplifies, demodulates, and forwards the signals to a microprocessor 128, preferably, an INTEL SC80C751. The microprocessor is activated and deactivated by a real-time clock 132, preferably, an INTERSIL ICM7170, which turns the pager apparatus on and off at predetermined time intervals for energy conservation.

The microprocessor 128 is connected to an audio oscillator circuit 142, which activates an audio transducer 144. The audio transducer emits, when prompted by the microprocessor, audio signals that alert the pager holder of incoming paging messages. The audio circuit may be turned on and off with the switch 146. Additionally, the pager apparatus comprises a display 148, preferably, an LCD display, as a readout device. This display is switched on and off by switch 150. The display includes indicators 150 indicating a low battery, indicator 152 for indicating receipt of a new message, indicator 154 for indicating receipt of a voice message, indicator 156 for indicating that the audio transducer is off, an out of range indicator 158 and an echo indicator 160. The echo indicator is for use when the caller receives verification of transmission of his message.

Whereas only one embodiment of the paging apparatus has been described, it will be apparent to those skilled in the art that other pager designs could be advantageously used by the present invention.

The digital synchronization between the transmitter and the receiving pager apparatus will now be explained. To conserve energy in a pager apparatus, each pager is activated only for a short period of time within a specified time interval, e.g., for three seconds every 5 minutes. Each profile at the central transmitting station includes a time interval to be assigned to every pager within the jurisdiction of the central station. Thus, the transmitter will only transmit paging messages to a given pager apparatus during the time interval designated to that pager apparatus. The real-time clock built in the pager keeps an accurate timing to turn the appropriate circuitry on at the specified time. To avoid long term drifts and the possibility of glitches, the transmitter will send out date and timing information with each frame or, alternatively, within plural frames. This procedure permits synchronizing each pager clock with the central transmitting station clock. This information is global in nature, i.e., all pagers in the system receive this information and, normally, follows the synchronization and global bytes, preferably, immediately preceding the messages within the data frame.

Figure 6A:
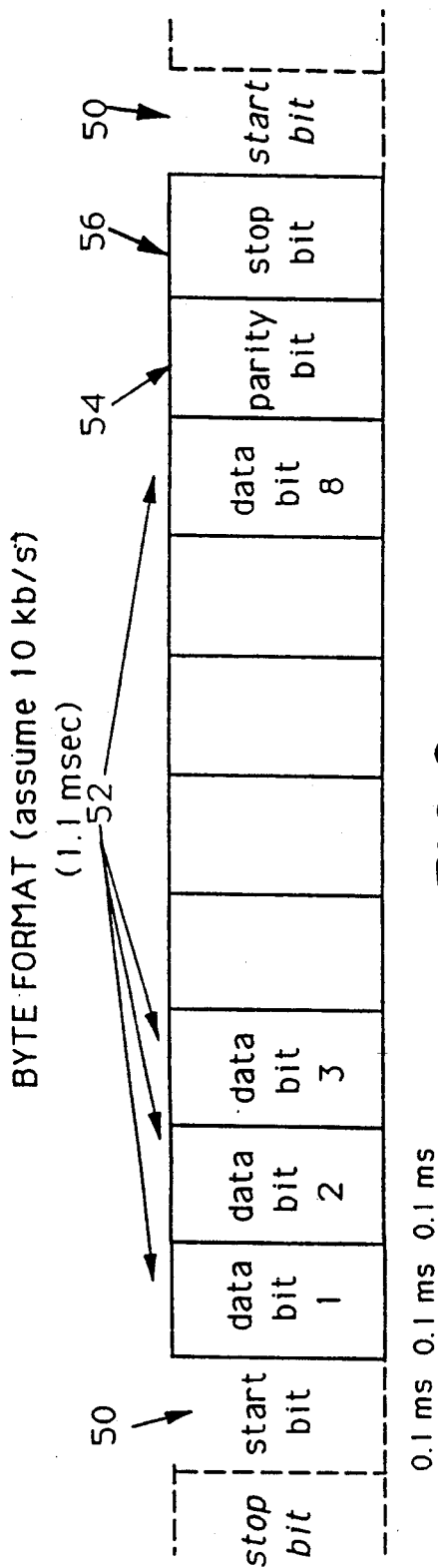
FIG. 6(a) shows the digital make-up of the data format of a paging signal received by the receiver according to the invention.

Referring now to FIG. 6(a) there is shown the UART protocol used to format the stream of data. This protocol is a byte oriented ASCII protocol, well known to those familiar with the state of the art. Bits within the UART are non-return to zero (NRZ) which restricts having any space between two adjacent highs (logic 1's). The beginning of a byte is indicated by a start bit 50, characterized by its high-to-low transition. The low bit is sampled to determine the phase of the data stream, namely, its position in time. Start bit 50 is followed by eight data bits 52—a byte, by an optional parity bit 54 and by a stop bit 56. The parity bit is used for error detection, whereas the stop bit indicates the end of a byte. It is known to those skilled in the art of formatting and transmitting data, that additional error detection or error detection and correction features could be added. In instances where sensitive information is to be transmitted, Hamming-coded based error correction could be preferable. Since it is of utmost importance in the present invention to avoid false alarms, the address portion of the message will be encoded. For example, a data rate of 10 kbits/sec. corresponds to a 0.1 millisecond pulse width, for a total byte length of 1.1 milliseconds. The bytes are assembled to form a data stream at the transmission end and are beamed after modulation.

Figure 6B:
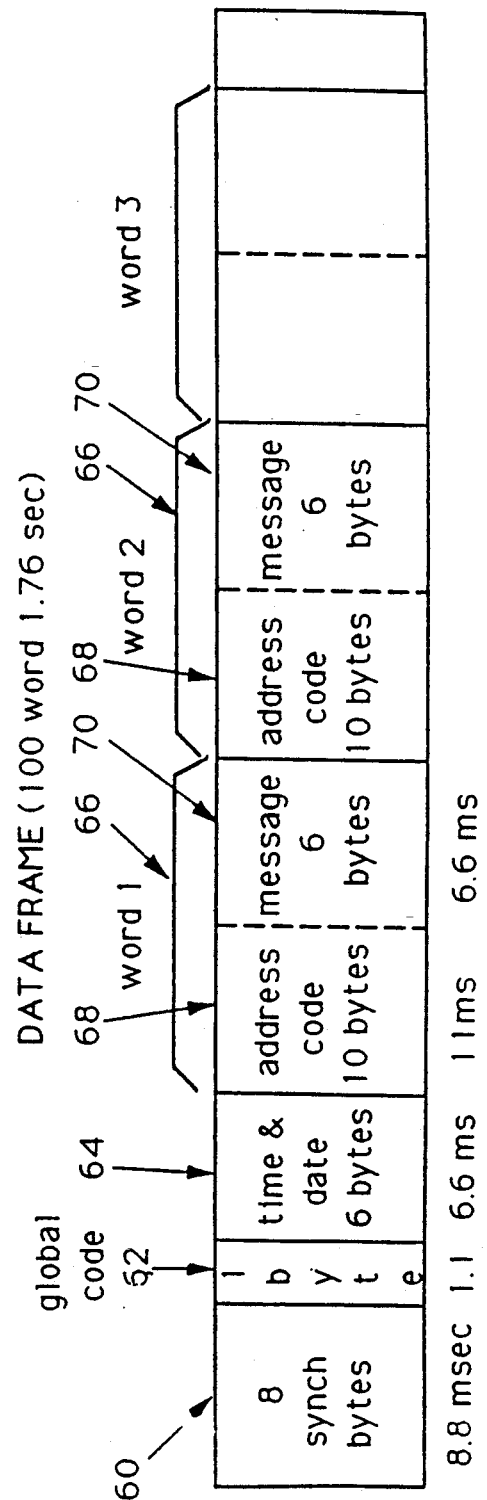
FIG. 6(b) shows the digital make-up of the byte format of the UART protocol.

A typical data frame is illustrated in FIG. 6(b). The frame begins with, preferably, eight synchronization bytes. These bytes contain bit sequences that cannot be mistaken for data messages, thus allowing the microprocessor (FIG. 5, block 128) to determine the beginning of the frame. The frame format is programmed in the microprocessor to permit the pager apparatus to properly interpret the remaining fields.

The first byte following synchronization is the previously mentioned "global code" It determines the format of all remaining bytes within the frame. It also signals all active pagers at that time.

In a standard frame format, the first plural bytes correspond to, preferably, the Hamming-coded date and time that set the real-time clock (FIG. 5, block 130) in the pager apparatus. The remaining bytes in the standard format are partitioned into words. It is to be recognized that the optimum number of words is determined by a trade-off between minimizing the length of the frame and maintaining the overhead (i.e., synchronization bytes, date and time, etc.) a small percentage of the total. Likewise, there is a trade-off in that a shorter frame length allows for a short "on-time" which, in turn, conserves power of the battery. However, this reduces the number of messages that can be sent during a frame and therefore increases the queuing time, or possible waiting time, until that particular pager gets a message.

Following the date and the time bytes, a plurality of words 66 appears, each word divided into two fields: an address code 68 and a message 70. The address 68 corresponds to the address of the pager apparatus. It is compared to the internal addresses contained therein to determine whether the correct pager is being addressed. (The coded number entered by the caller is not necessarily the same as the address coded in the pager, but rather a translation to be performed by the system relating numbers known to the public with those that identify a pager). The correct pager apparatus decodes the message transmitted and displays its content on the read out display. Additional bits in the message field are reserved for the previously mentioned "local codes".

Figure 7A:
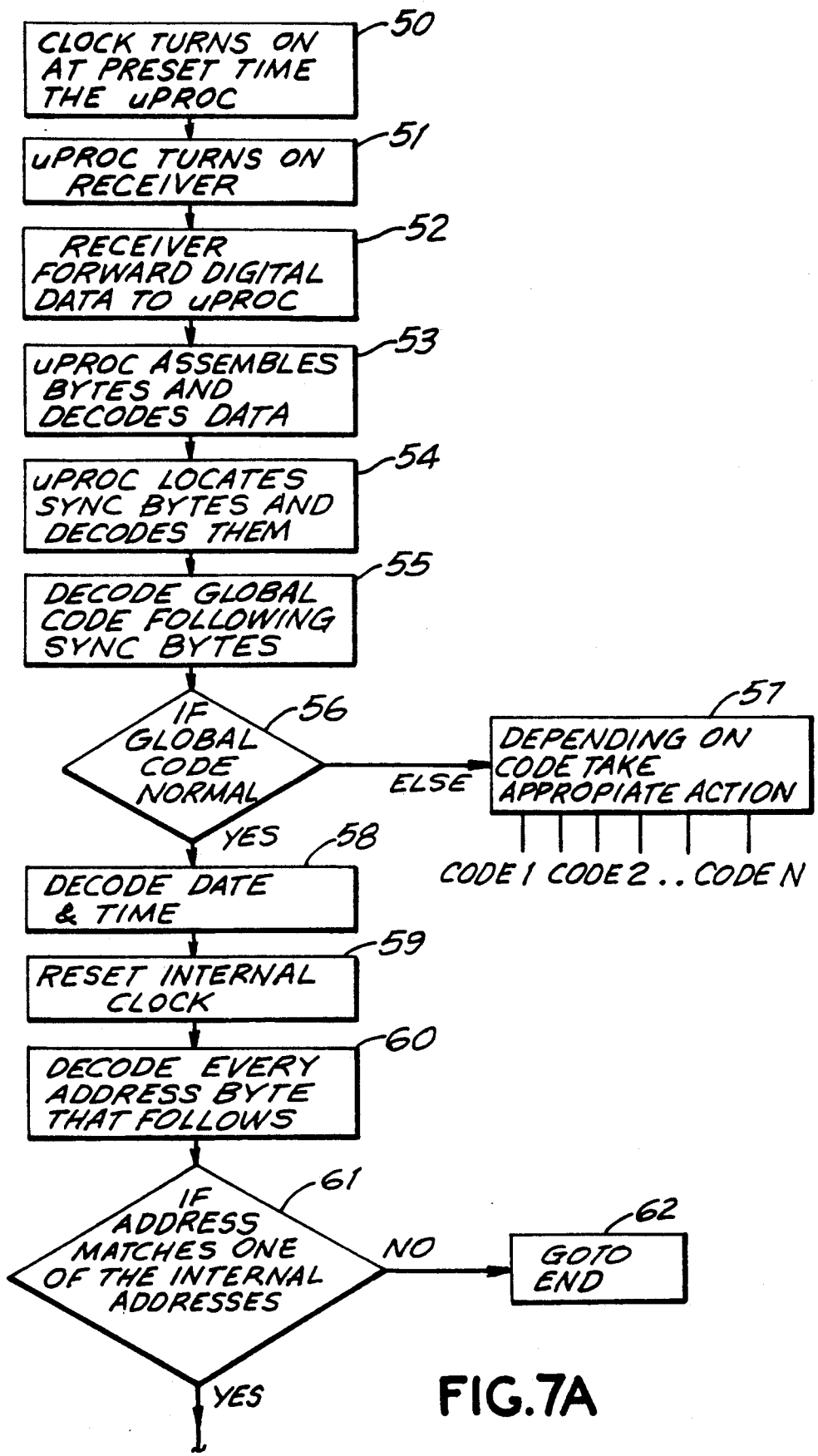
FIG. 7(a) and 7(b) comprise a flow chart of the signal decoding and processing at the receiving end of the paging system.
Figure 7B:
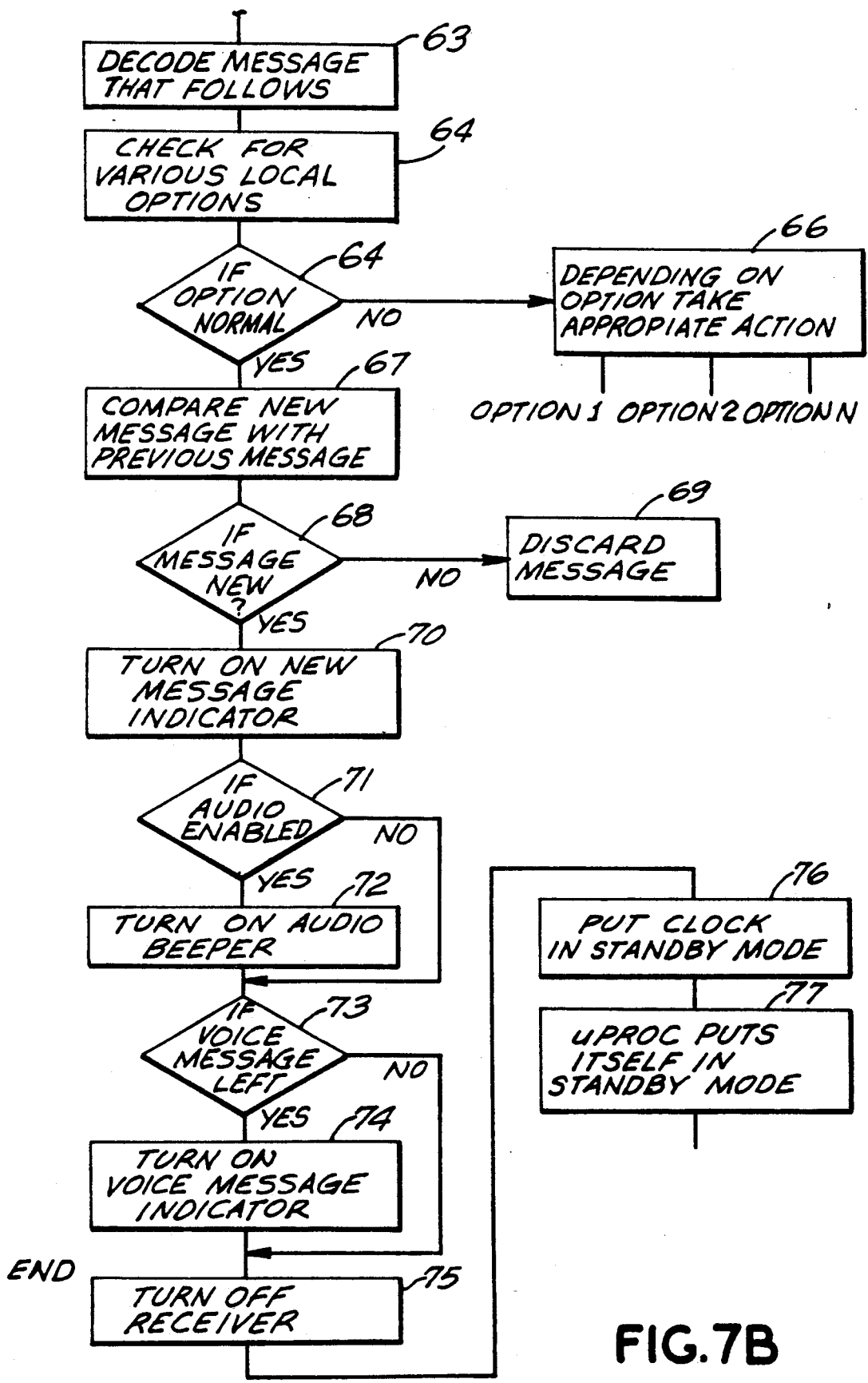

Referring to FIG. 7(a) and 7(b), which describes a preferred flow of the signal decoding and processing, as viewed by the paging device. A real-time clock activates the microprocessor which, in turn, enables the receiver (blocks 50 and 51). This initiates the data acquisition process. The data received by the receiver is forwarded to the microprocessor (block 52) for assembly of the bytes and decoding of the data (block 53). It locates the synchronization bytes, decodes them (block 54) together with the global code that normally follows the synchronization bytes (block 55). The microprocessor interrogates the global code to determine its content (block 56). If it is normal, it proceeds to block 58, where the date and time of the message are decoded and are used to reset the real-time clock to be synchronized with the transmitter (block 59). Otherwise, it branches to block 57, where the special nature of the global code is analyzed for further branching to the various subroutines, depending on the code.

Proceeding with the main data acquisition loop, every address of the message following the time and date is decoded (block 60). The system interrogates the various addresses to determine whether any of them matches one of the address codes of the pager device (block 61). If there is no match, the process terminates (block 62). If, alternatively, one of the addresses in the protocol coincides with one of the addresses coded in the paging apparatus, the processor decodes the ensuing message (block 63) and checks the various local options (block 64). A normal option forces a branch to block 67, where a comparison is made with the previous message stored. Otherwise, appropriate action is taken depending on the coded option, and branching to the appropriate subroutine takes place (block 66).

Continuing with the main program, if the message is a repeat of a previous one, decision block 68 forces a branch to block 69, and the repeated message is ignored, since retransmission takes place several times to ensure reception. If the message transmitted and decoded is new, block 70 is activated, and the "new message" indicator is turned on. It is thereafter turned off when the pager holder activates the display to read his message. The audio control is also enabled (blocks 71 and 72), but only if the audio features of the pager device are on. Otherwise, the audio circuit is bypassed, and only the visual indicator is activated. If the reserved bits in the message field indicate that a voice message was left at the central station, (blocks 73 and 74), the "voice message" indicator will alert the pager holder, informing him that a message is waiting at the central station. It is turned off thereafter once the pager holder retrieves his message or, alternatively, by the transmitting station at periodic intervals. In the absence of a voice message, no action is taken, and the system branches to END. The pager is deactivated and returned to an energy conservation standby mode until the next time slot when it is "woken up" by the clock (blocks 75 through 77).

Figure 7C:
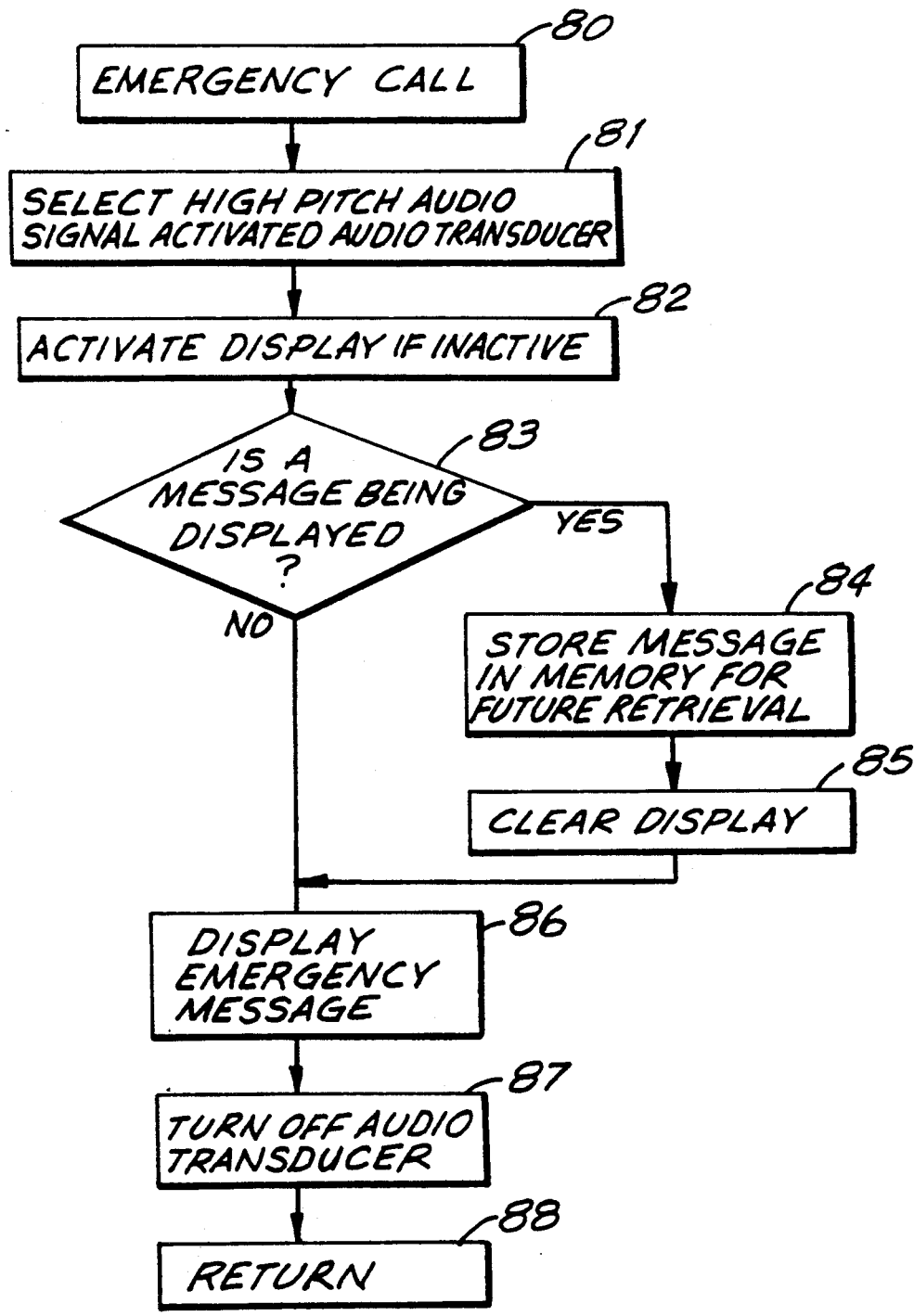
FIG. 7(c) shows a flow chart of a subroutine that represents the action that results from decoding a global code within the data frame.

Referring now to FIG. 7(c), showing the decoding of the global codes and their conversion into specific hardware functions. In the data stream, one or more bytes following the synchronization bytes are designated as the global option bytes. All pager apparatus within the system respond to these bytes, since none in particular is addressed. These bytes determine, additionally, the format of the rest of the data frame. Accordingly, all pager apparatus within the system are programmed to interpret the incoming data stream in conformance with the changes in frame format introduced by the options.

The decoding of the global code by the microprocessor prompts the generation of electrical signals to the various features of the pager apparatus. For example, a Code 1 invokes the subroutine "Emergency Call" (block 80). The subroutine initiates a command to activate the audio transducer to emit a beep with a distinctive amplitude and frequency, recognized by the pager holder as an incoming emergency signal (blocks 81–82). The subroutine checks whether a message is currently being displayed (block 83). If the answer is YES, a command is issued to temporarily store in memory the previous message (block 84). The visual display is cleared and the emergency message is displayed. The subroutine ends, and returns to the main program.

Other functions can be activated by the various subroutines. A preferred subset is:
Disable the audio transducer, for a quiet reception of a message;
Enable or disable the receiver, if a password protected lockout command is issued;
Enable or reactivate all audio circuits, for normal operation of the pager apparatus;
Clear the "new message" indicator;
Clear the "voice message" indicator, preferably by the central station.

Figure 7D:
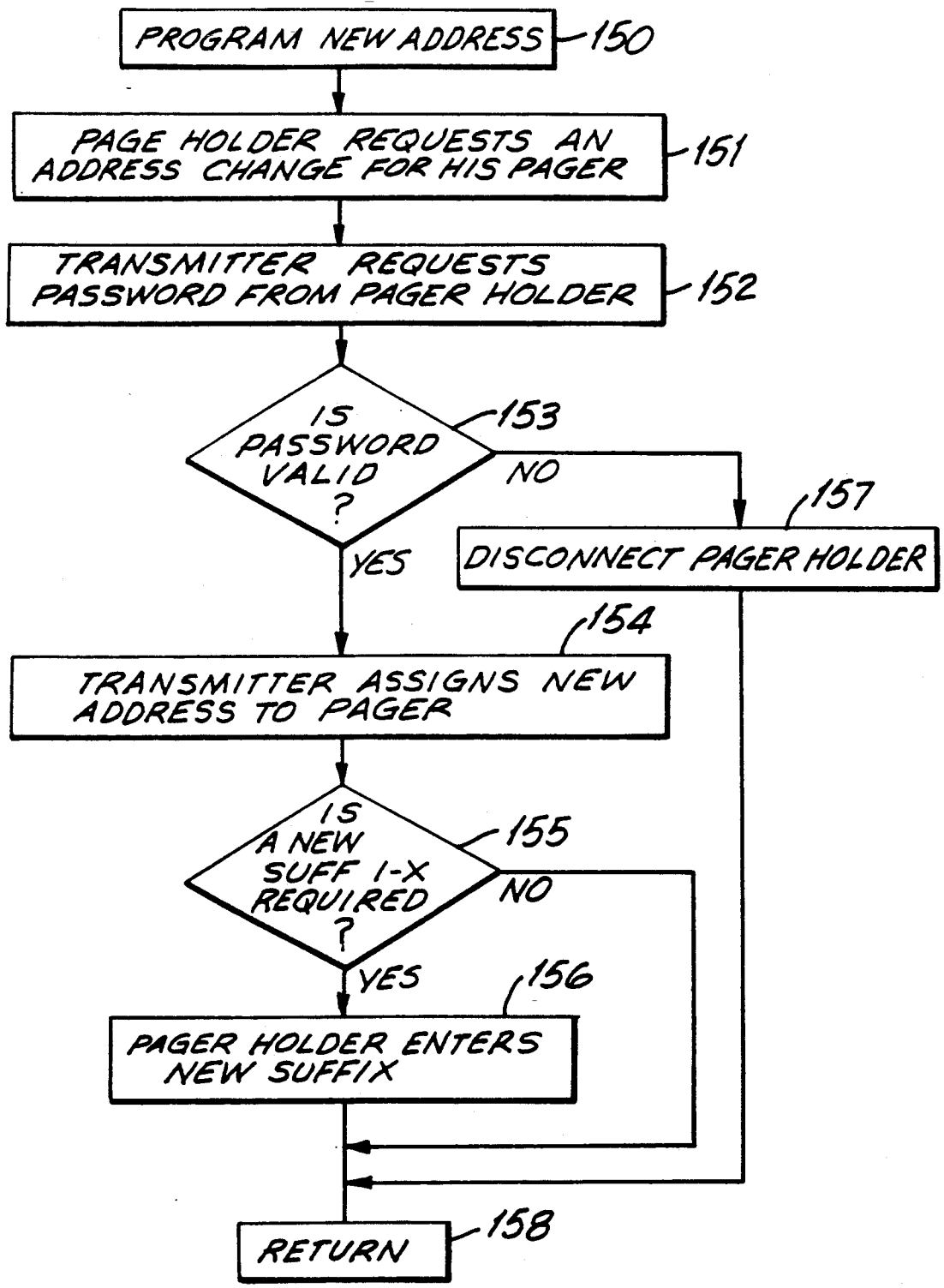
FIG. 7(d) is a flow chart of a subroutine that represents the action resulting from decoding a local option at the pager apparatus.
Figure 9:
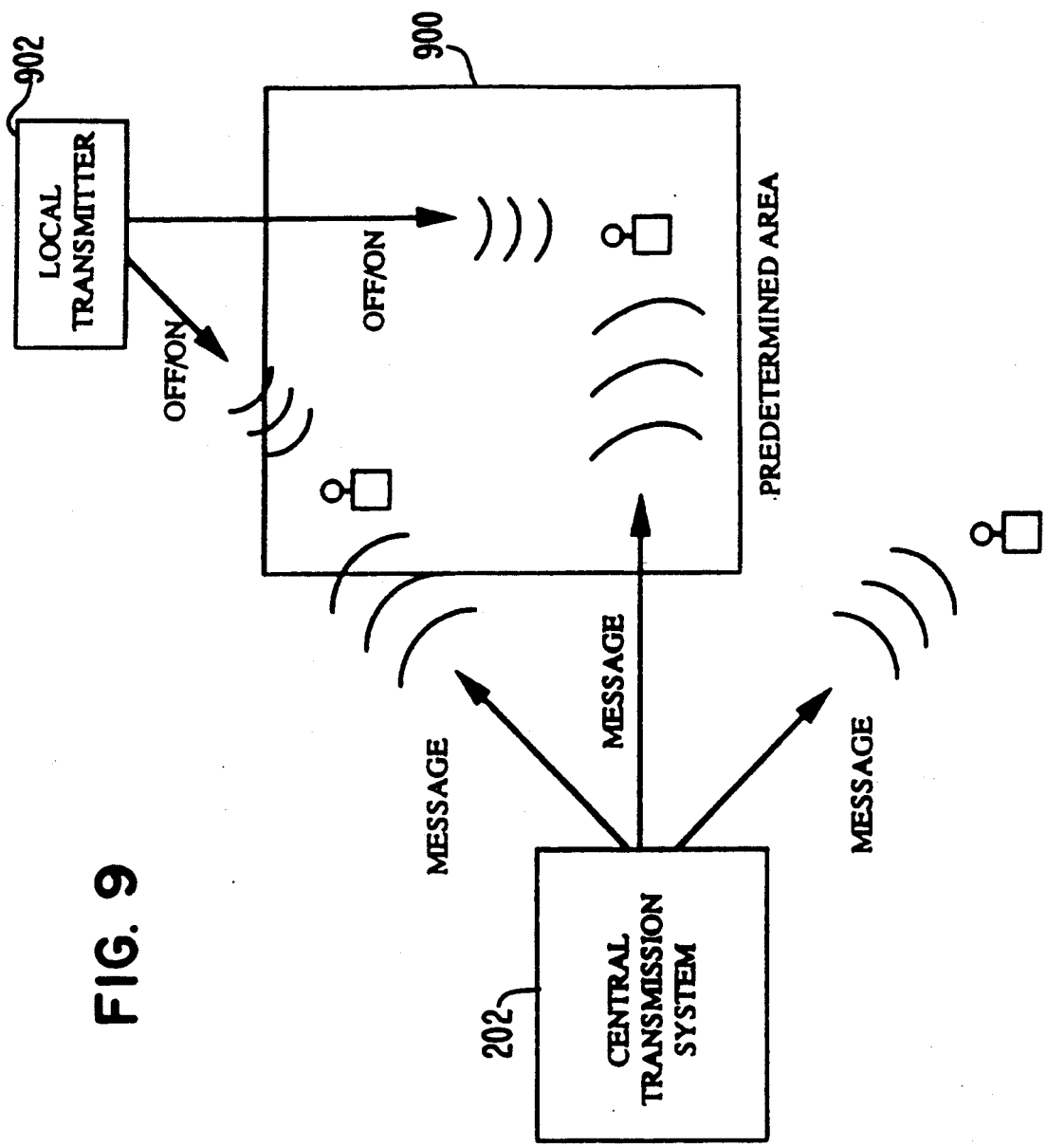
FIG. 9 is a diagram showing local area cutoff.

Referring now to FIG. 7(d), which shows an example of a local code option after branching out of block 66 in the main program. Unlike global options which concern all paging devices within the system, local options are restricted to a particular paging device. More specifically, local options are exercised only after an address has been decoded and the particular pager device has been addressed. The presence of extra bits in the message field specifies how to interpret the remainder of the message and how to handle any special options, many similar in nature to the global options. Examples of local options are:

Reprogram the time slot for the paging apparatus;

Reprogram the pager apparatus for a new identity number;

Enable or disable the audio circuits of the pager device in a predetermined local area 900 smaller than the pager service region using a local transmitter 902 as illustrated in FIG. 9.

The procedure for a user to change the address of his pager will be explained to illustrate a Local Code Option. The subroutine in the central station is invoked by selecting the appropriate option at block 66 of the main program. The pager holder requests a change of address for his pager device (block 151). The system requests that the password in force be entered (block 152). If the password is valid, the system recognizes the pager holder and assigns a new address to the pager device (block 154). The system interrogates the pager holder if suffixes are desired (block 155). If the answer is YES, the pager holder enters the appropriate suffixes (block 156), one for each member of his family or group. if the password was invalid, the system automatically disconnects the pager holder (block 157).

Figure 8:
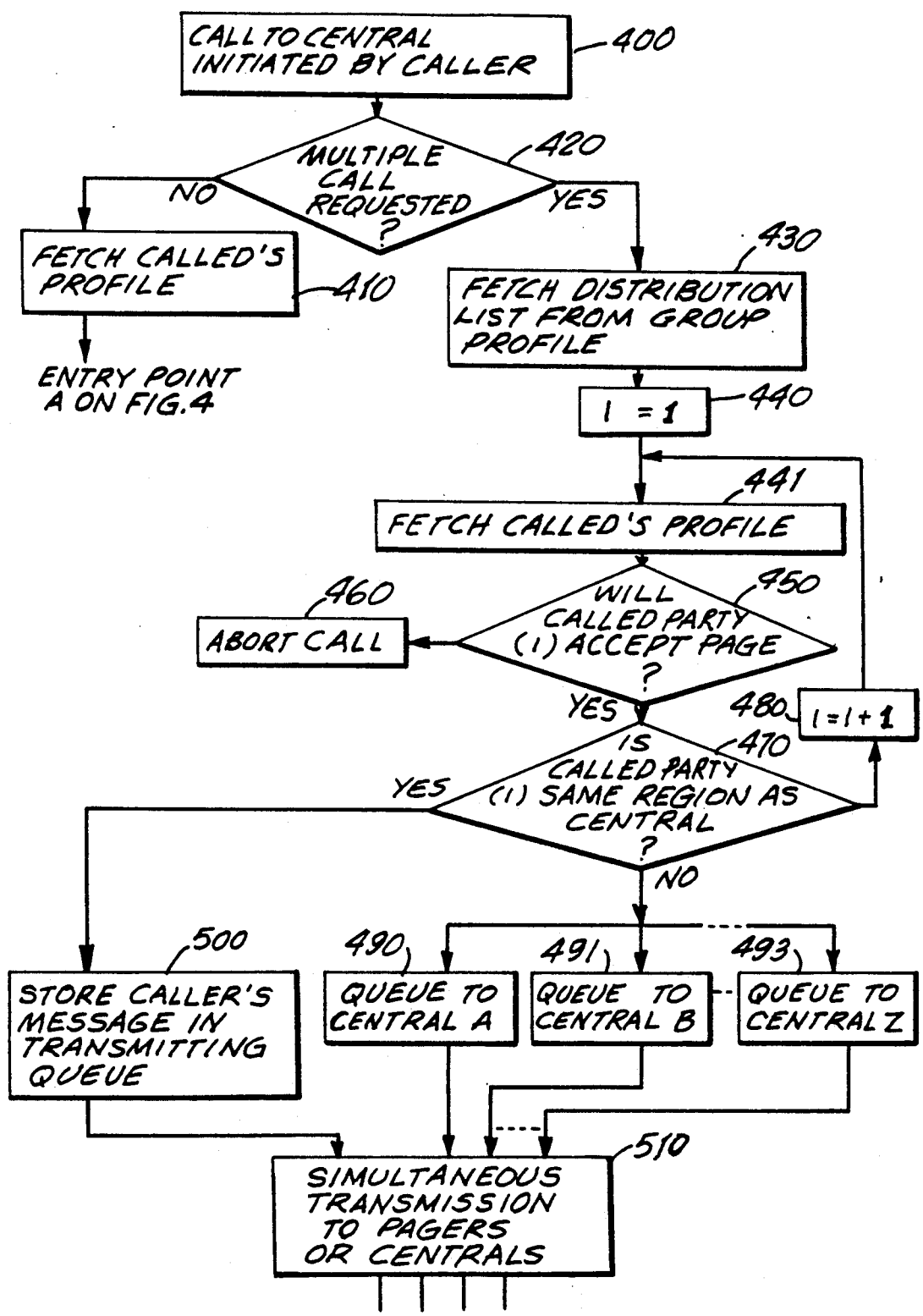
FIG. 8 is a flow chart showing how profile information is processed by the central station.

FIG. 8 shows a flow chart of how profile information normally stored at a central station is processed. As previously explained, a caller initiates a paging call to the central station via telephone lines (block 400). The system determines whether the paging message is to be transmitted to one or to a plurality of paging devices (block 420). If the call is to be forwarded to a single party, the profile of the called party is fetched (block 410) and then a branch to entry point A in FIG. 4 takes effect, and all subsequent steps shown therein are sequentially activated. If the caller wishes to initiate a multiple call, e.g., to transmit a message to all members of a given group, the appropriate distribution list is fetched from the group's profile (block 430), and each member of the group of called parties is individually polled by examining his profile to determine whether the caller's identity is acceptable (blocks 440-480). If the member polled accepts the call, his profile is further examined to establish his present location. If he is in the same region as the central station, the message is added to the transmitting queue (block 500). If, on the other hand, the profile of the party called shows that he is temporarily away at a geographical region under the jurisdiction of some other central station B, C, ... Z, the message is added to the queue of messages to be directed to the appropriate central station (blocks 490, ... , 499). At predetermined intervals, all messages are simultaneously transmitted to their respective destinations (block 500).

While only certain embodiments of the present invention have been described, it is apparent to those skilled in the art that various changes and modifications may be made without departing from the spirit and scope of the present invention.

I claim:

1. A paging system, comprising:

a central station having a pager service region;

a plurality of pager apparatus responsive to said central station; and calling means for a caller to access the central station and place a call to at least one of said pager apparatus to transmit a message thereto;

aid central station comprising:

receiving means for receiving the call from the caller, processing means for processing the call in accordance with prescribed information relating to the caller and the called pager apparatus, transmitting means responsive to the processed information for providing signalling to said at least one pager apparatus and transmitting thereto information relative to the message, calculating means for billing for the transmission of the call, and a local transmitter including means for cutting off, at the pager apparatus, signals produced by all pager apparatus entering and within a local predetermined area smaller than the pager service region.

2. A method of paging a called party by a caller, comprising:

telephoning by the caller into a central station and placing a call to at least one pager in the paging system to transmit a message thereto, and providing an identification of the caller;

receiving the call at the central station and processing the call in accordance with a profile of stored information about the transmission services prescribed by the holder of the called pager;

transmitting in accordance with the prescribed information of the called party a paging signal addressed to the called party together with information relative to the message;

billing based upon the transmission of the call, wherein the identification of the caller corresponds to the address of a pager of the caller; and transmitting to the pager of the caller the information relative to the message being addressed to the called pager, to permit transmission verification by the caller.

* * * * *